United States Patent [19]
Kurita et al.

[11] Patent Number: 5,894,459
[45] Date of Patent: Apr. 13, 1999

[54] OPTICAL RECORDING/REPRODUCING DEVICE HAVING A CONTROLLER FOR REDUCING VIBRATIONAL NOISE DURING RECORDING BY SLOWING MOVING SPEED OF PICKUP

[75] Inventors: Kazuhito Kurita, Kanagawa; Kunio Shimizu, Chiba; Tatsuto Suetomi, Kanagawa, all of Japan

[73] Assignee: Sony Corporation, Tokyo, Japan

[21] Appl. No.: 08/866,661

[22] Filed: Jun. 5, 1997

Related U.S. Application Data

[63] Continuation of application No. 08/521,602, Aug. 30, 1995, Pat. No. 5,684,763.

[30] Foreign Application Priority Data

Aug. 31, 1994 [JP] Japan ................... 6-207732
Aug. 31, 1994 [JP] Japan ................... 6-207733

[51] Int. Cl.$^6$ ................................ G11B 11/00
[52] U.S. Cl. ....................... 369/13; 369/54; 369/58
[58] Field of Search ...................... 369/13, 54, 58, 369/47, 116, 120, 48, 49, 44.28, 32; 360/71, 77.01

[56] References Cited

U.S. PATENT DOCUMENTS

| | | | |
|---|---|---|---|
| 3,876,842 | 4/1975 | Bouwhuis | 369/109 |
| 3,909,608 | 9/1975 | Le Merer et al. | 250/202 |
| 4,023,033 | 5/1977 | Bricot et al. | 250/201.5 |
| 4,998,231 | 3/1991 | Watanabe et al. | 369/13 |
| 5,072,431 | 12/1991 | Ohmori et al. | 369/13 |
| 5,161,140 | 11/1992 | Terada | 369/44.28 |
| 5,309,421 | 5/1994 | Fujisawa | 369/77.1 |
| 5,343,452 | 8/1994 | Maeda et al. | 369/32 |
| 5,504,728 | 4/1996 | Yokota et al. | 369/58 |
| 5,684,763 | 11/1997 | Kurita et al. | 369/13 |

FOREIGN PATENT DOCUMENTS

| | | |
|---|---|---|
| 0 379 444 | 1/1990 | European Pat. Off. |
| 0 485 994 | 1/1991 | European Pat. Off. |
| 0 465 053 | 6/1991 | European Pat. Off. |
| 0 504 429 | 10/1991 | European Pat. Off. |
| 0 501 337 | 2/1992 | European Pat. Off. |
| 0 559 104 | 2/1993 | European Pat. Off. |
| 0 606 157 | 1/1994 | European Pat. Off. |

*Primary Examiner*—Ali Neyzari
*Attorney, Agent, or Firm*—Limbach & Limbach L.L.P.

[57] ABSTRACT

An apparatus for recording and/or reproducing a disk-shaped optical recording medium such as a magneto-optical disk includes recording and/or reproducing unit, a moving unit and a controller. The recording and/or reproducing unit records input information on the disk-shaped optical recording medium loaded on the apparatus and reads out information recorded on the optical recording medium. The moving unit moves the recording and/or reproducing unit in the radius direction of the disk-shaped optical recording medium. The controller controls a recording and/or reproducing operation of the recording and/or reproducing unit and an operation of the moving unit. The controller controls the moving unit such that a moving speed for moving the recording and/or reproducing unit by the moving unit when the recording and/or reproducing unit records input information on the disk-shaped optical recording medium is lowered as compared with a moving speed for moving the recording and/or reproducing unit by the moving unit when the recording and/or reproducing unit reproduces the disk-shaped optical recording medium.

3 Claims, 6 Drawing Sheets

OPTICAL RECORDING/REPRODUCING DEVICE HAVING A CONTROLLER FOR REDUCING VIBRATIONAL NOISE DURING RECORDING BY SLOWING MOVING SPEED OF PICKUP

This is a continuation of application Ser. No. 08/521,602, filed Aug. 30, 1995, now U.S. Pat. No. 5,684,763.

FIELD OF THE INVENTION

The present invention relates to an apparatus for recording and/or reproducing information to/from a disk-shaped optical recording medium. More particularly, this invention relates to an apparatus for recording and/or reproducing a disk-shaped optical recording medium and a magneto-optical disk recording apparatus having a movement mechanism for moving, or transporting, a recording and/or reproducing pickup portion.

BACKGROUND OF THE INVENTION

Disk recording and reproducing apparatus using a magneto-optical disk as a disk-shaped optical recording medium are now commercially available on the market. On the magneto-optical disk, data concerning recorded data is recorded on an innermost peripheral track called a TOC (table of contents). When the magneto-optical disk is reproduced, a reproduced track is searched and located by checking data recorded on the TOC.

When such magneto-optical disk is recorded or reproduced by sing data (referred to hereinafter simply as "TOC data") recorded on the TOC, a set of data can be recorded on discontinuous tracks on the magneto-optical disk. Specifically, as shown in FIG. 1 of the accompanying drawings, an audio signal of 74 minutes can be recorded on one disk. Assume now that audio signals of four pieces of music of track numbers T1, T2, T3, T4 are recorded on one disk and that non-recorded portions Ta, Tb, Tc each having a duration of several minutes are provided between pieces of music of track numbers T1 and T2, T2 and T3, and between pieces of music of track numbers T3 and T4. In this state, when an audio signal of music having a play time of 10 minutes, for example, is newly recorded on this disk as a track number T5, if an audio signal having a play time of 10 minutes can be recorded in total on the non-recorded portions Ta, Tb and Tc, as shown in FIG. 1, the audio signal of the track number T5 is recorded on the three non-recorded portions Ta, Tb and Tc separately. As the TOC data, there is added data indicating that the music of the track number T5 is recorded on the addresses of the non-recorded portions Ta, Tb and Tc.

When the music of the track number T5 is reproduced, a system controller (not shown) controls an optical pickup on the basis of the TOC data such that the optical pickup is moved over the tracks indicated by the addresses of the recorded positions Ta, Tb and Tc. In this case, since the recorded position is divided as the recorded positions Ta, Tb and Tc as shown in FIG. 1, if the music of the track number T5 is reproduced in this state, then a sound as a reproduced output is interrupted by a time in which the optical pickup is moved during the optical pickup is moved between the recorded positions Ta and Tb and between the recorded positions Tb and Tc.

To prevent the reproduced output from being interrupted, the recording and reproducing apparatus using the magneto-optical disk stores data read out from the disk in a semiconductor memory by a duration of several seconds in the form of sounds as the reproduced output. Therefore, recorded data is read out from the disk earlier than the reproduction timing of the reproduced signal output from the recording and reproducing apparatus by several seconds. In the discontinuous portion of the recorded positions, e.g., the discontinuous portion between the recorded positions Ta and Tb, the data recorded on the above semiconductor memory is output and the optical pickup is moved to the next recorded position, e.g., the optical pickup is moved from the recorded position Ta to the recorded position Tb while data stored in the memory are fully read out until the memory becomes empty. In this way, the audio signal that had been discretely recorded on the magneto-optical disk can be reproduced continuously by using the memory.

Also when an audio signal is recorded on the disk, in order to prevent the audio signal from being dropped because the audio signal is recorded on a plurality of discrete recorded positions on the disk, the recorded audio signal is temporarily stored in the memory so as to maintain a time during which the optical pickup can be moved between a plurality of discrete recorded positions. In such case, the optical pickup is moved by a moving device in the radius direction of the disk. The moving mechanism is generally composed of a moving motor and an optical pickup moving mechanism.

In the above-mentioned magneto-optical disk recording and reproducing apparatus, when data based on a continuous audio signal is recorded on the magneto-optical disk, the optical pickup irradiates the magneto-optical disk with light beam to heat a recording film of the magneto-optical disk in excess of the Curie temperature. Concurrently therewith, a magnetic head that is opposed to the optical pickup across the magneto-optical disk applies a vertical magnetic field to the magneto-optical disk. The vertical magnetic field generated from the magnetic head is modulated on the basis of recorded-data with the result that the recording film of the magneto-optical disk is magnetized in the direction of the vertical magnetic field applied from the magnetic head to thereby record data. When data that has been recorded on the magneto-optical disk is reproduced, a light beam of output level sufficiently lower than the output level of the light beam used upon recording irradiates the magneto-optical disk. In the light beam radiated on the magneto-optical disk, a plane of polarization thereof is rotated by the magnetization direction of the recording film due to Kerr effect. Recorded data is read out from the magneto-optical disk by effectively utilizing the rotation of the plane of polarization due to the Kerr effect. Accordingly, the magnetic head is used only during the recording mode and is generally placed within the apparatus at the position distant from the magneto-optical disk. Only when the magnetic head records data, the magnetic head is moved in or elevated or lowered to the position near or in contact with the magneto-optical disk.

The magnetic head is moved by energizing a suitable driving means, such as a loading motor after a recording start key of the recording apparatus, for example, was depressed. It takes several seconds for the magnetic head to move to a predetermined position to record data on the magneto-optical disk after the recording start key was depressed. In the case of the apparatus for recording and reproducing the magneto-optical disk, an input audio signal is stored in the semiconductor memory until data starts being recorded on the magneto-optical disk. Then, immediately after the magnetic head is moved to the predetermined position, the input audio signal is continuously recorded on the magneto-optical disk.

If the optical pickup is moved in the radius direction of the magneto-optical disk during the recording operation when data is recorded on a plurality of discrete recording positions on the magneto-optical disk as described above, then a noise is generated when a moving motor of the moving device is driven. The noise thus generated is mixed with recorded data and recorded on the magneto-optical disk together with recorded data. In particular, when a portable recording apparatus incorporates a microphone or an external microphone is located at the position near the recording apparatus, the microphone tends to pick up the sound of a noise generated from the recording and reproducing apparatus. Therefore, a noise generated when the feed motor is driven becomes conspicuous.

Further, a noise generated by the drive motor for moving or elevating the magnetic head in order to move the magnetic head to the position near the magneto-optical disk when the recording is started becomes relatively conspicuous. Since the magnetic head has to be moved when the recording is started, if the portable recording apparatus incorporates the microphone or the microphone is located at the position close to the recording and reproducing apparatus, then it is unavoidable that a relatively large noise is recorded when the recording is started.

SUMMARY OF THE INVENTION

It is an object of the present invention to provide a disk-shaped recording medium recording and/or reproducing apparatus in which the above-mentioned problem can be solved.

It is another object of the present invention to provide a disk-shaped recording medium recording apparatus in which the above-mentioned problem can be solved.

It is a further object of the present invention to provide a magneto-optical disk recording apparatus in which the above-mentioned problem can be solve.

According to the present invention, there is provided an apparatus for recording and/or reproducing a disk-shaped optical recording medium which includes a recording and/or reproducing unit, a movement unit and a controller. The recording and/or reproducing unit records information input to a loaded disk-shaped optical recording medium and reads out information recorded on the optical recording medium. The movement unit moves the recording and/or reproducing unit in the radius direction of the disk-shaped optical recording medium. The controller controls the recording and/or reproducing operation of the recording and/or reproducing unit and also controls an operation of the movement unit. The controller controls the movement unit such that a moving speed at which the movement unit is moved when the recording and/or reproducing unit records information input to the recording medium becomes lower than a moving speed at which the movement unit is moved when the recording and/reproducing unit reproduces the recording medium.

According to the present invention, there is provided an apparatus for recording and/or reproducing a disk-shaped optical recording medium which includes a recording and/or reproducing unit, a movement unit and a controller. The recording and/or reproducing unit records a signal input to a loaded disk-shaped optical recording medium and reproduces a signal recorded on the optical recording medium. The movement unit moves the recording and/or reproducing unit in the radius direction of the disk-shaped optical recording medium. The controller controls a recording operation of the recording and/or reproducing unit and also controls an operation of the movement unit. The controller controls the movement unit such that a moving speed at which the movement unit is moved when the recording and/or reproducing unit records an output signal from a microphone on the recording medium becomes lower than a moving speed at which the movement unit is moved when the recording and/or reproducing unit reproduces the recording medium.

According to the present invention, there is provided a magneto-optical disk recording apparatus which includes an optical pickup, a magnetic field generating unit, an elevating unit and a controller. The optical pickup radiates light beam on the magneto-optical disk. The magnetic field generating unit applies a vertical magnetic field to the magneto-optical disk to record a signal on the magneto-optical disk in cooperation with the optical pickup. The elevating unit elevates the magnetic field generating unit between a first position at which the magnetic field generating unit records information on the magneto-optical disk in cooperation with the optical pickup and a second position above the first position and which is spaced apart from the magneto-optical disk. The controller controls the recording operation of the optical pickup and the magnetic field generating unit and also controls the operation of the elevating unit. The controller controls the elevating unit such that a moving speed at which the magnetic field generating unit is moved from the first position to the second position when an output signal from a microphone is recorded on the magneto-optical disk by the optical pickup and the magnetic field generating unit is lowered.

According to the present invention, there is provided an apparatus for recording and/or reproducing a disk-shaped optical recording medium which includes a recording and/or reproducing unit, a movement unit, a microphone and a controller. The recording and/or reproducing unit records input information on the loaded disk-shaped optical recording medium and reads out information recorded on the optical recording medium. The movement unit moves the recording and/or reproducing unit in the radius direction of the disk-shaped optical recording medium. The controller controls the recording and/or reproducing operation of the recording and/or reproducing unit and also controls the movement unit. The controller controls the movement unit on the basis of an output signal from the microphone such that a moving speed at which the movement unit is moved when the recording and/or reproducing unit records the optical recording medium becomes lower than a moving speed at which the movement unit is moved when the recording and/or reproducing unit reproduces the optical recording medium.

According to the present invention, there is provided an apparatus for recording and/or reproducing a disk-shaped optical recording medium which includes a recording and/or reproducing unit, a memory, a movement unit and a controller. The recording and/or reproducing unit records input information on a loaded disk-shaped optical recording medium and reads out information recorded on the optical recording medium. The memory temporarily memorizes input information, supplies recorded information to the recording and/or reproducing unit and temporarily memorizes information read out from the optical recording medium by the recording and/or reproducing unit. The memory is controlled such that, when information is recorded on the optical recording medium by the recording and/or reproducing unit, a speed for writing the input information becomes lower than a speed for reading out stored information and that, when information is read out from the optical recording medium by the recording and/or reproducing unit, a speed for reading out stored information becomes lower than a speed for writing information read out by the recording and/or reproducing unit. The movement unit moves the recording and/or reproducing unit in the radius direction of the disk-shaped optical recording medium. The controller controls recording and/or reproducing operation of the recording and/or reproducing unit, controls the write and read operations of the memory and controls the operation of the movement unit. The controller controls the movement unit such that a moving speed at which the movement unit is moved when the recording and/or reproducing unit records input information on the optical recording medium becomes lower than a moving speed at which the movement unit is moved during the recording and/or reproducing unit reproduces the optical recording medium.

According to the present invention, it is possible to reduce a bad influence exerted upon data recorded on the recording medium by a noise or the like generated from the apparatus side upon recording by causing the moving speed at which the recording and/or reproducing unit is moved in the radius direction of the disks-shaped optical recording medium to become lower than the moving speed at which the recording and/or reproducing unit is moved upon reproducing.

Further, according to the present invention, since it is possible to reduce a noise or the like generated on the apparatus side upon recording by making the moving speed in which the recording means is moved in the radius direction of the disk-shaped optical recording medium when the recording means records a signal based on an output signal from a microphone incorporated in an apparatus body or an external microphone connected to the apparatus on the recording medium become lower than a moving speed at which the recording medium is reproduced, a noise component contained in the output signal from the microphone can be reduced and data can be recorded on the recording medium satisfactorily.

Furthermore, according to the present invention, since it is possible to reduce a noise or the like generated from the apparatus side upon recording by controlling the magnetic field generating unit such that an elevating speed at which the magnetic field generating unit is elevated when a signal based on an output signal from the microphone is recorded on the magneto-optical disk serving as the disk-shaped optical recording medium, data can be recorded on the recording medium satisfactorily.

BRIEF DESCRIPTION OF THE INVENTION

A recording and/or reproducing apparatus for recording and/or reproducing a disk-shaped optical recording medium according to an embodiment of the present invention will be described in detail below.

In this embodiment, a magneto-optical disk is used as a disk-shaped optical recording medium. Also, an apparatus for recording or reproducing an audio signal on or from a magneto-optical disk will be described by way of example.

Figure 2:
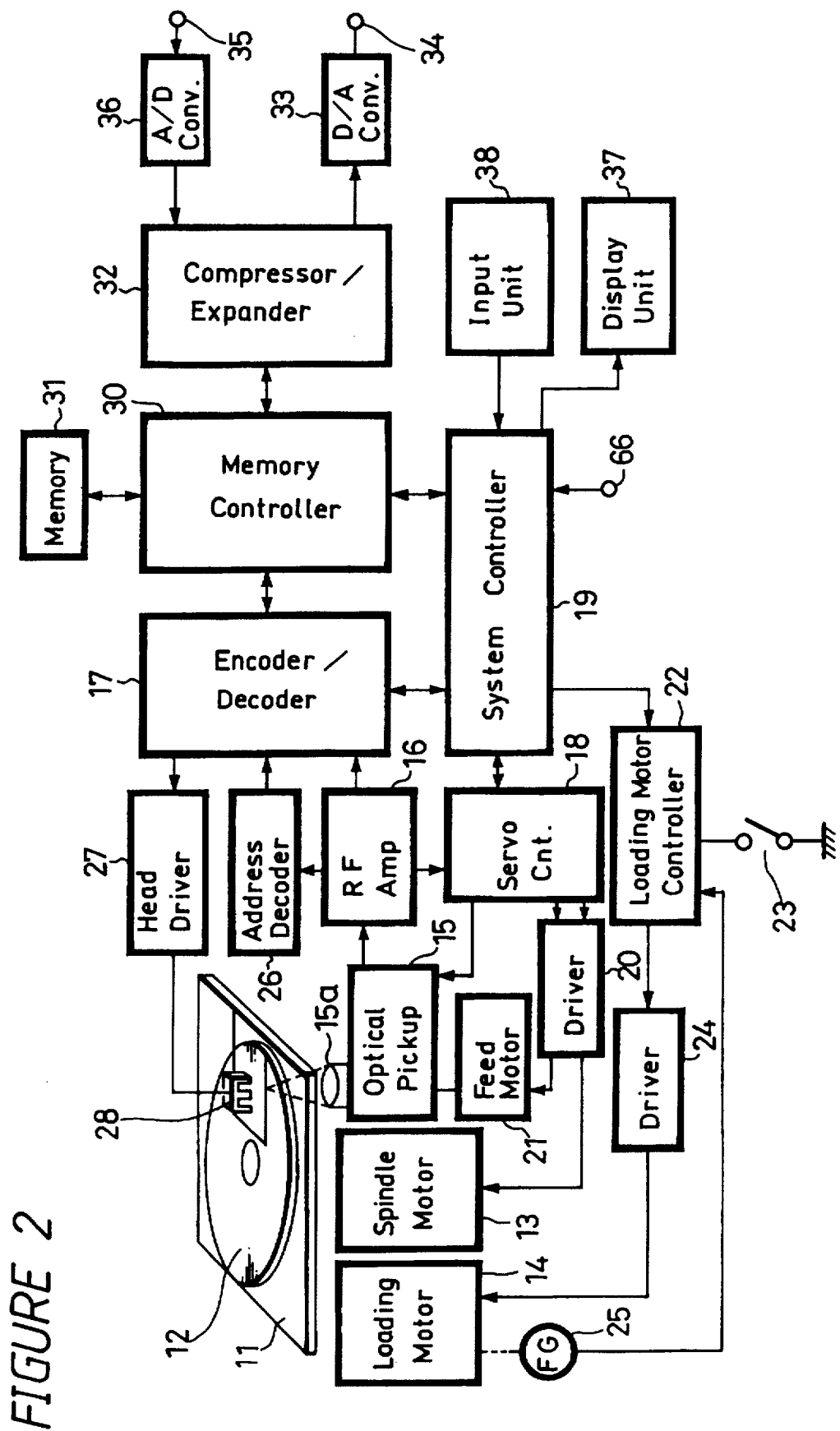
FIG. 2 is a block diagram showing a recording/reproducing unit of a recording and/or reproducing apparatus according to an embodiment of the present invention.

FIG. 2 shows a block diagram of such apparatus. As shown in FIG. 2, a disk cartridge 11 accommodates a magneto-optical disk 12. The disk cartridge 11 has a pair of opening portions (not shown) defined on opposing upper and lower surfaces of a disk cartridge body. The magneto-optical disk 12 that has been accommodated in the disk cartridge 11 through these opening portions is recorded or reproduced. The disk cartridge 11 has a shutter (not shown) slidably attached to the disk cartridge body so as to open and close a pair of opening portions. When the disk cartridge 11 is loaded on the recording and/or reproducing apparatus, the shutter is moved in the direction to open the pair of opening portions. When the disk cartridge 11 is ejected from the recording and/or reproducing apparatus, the shutter is moved in the direction to close the pair of opening portions.

The magneto-optical disk 12 is composed of a disk base, a recording film and a protecting film, though not shown. The disk base is made of a transparent material, such as a synthetic resin of polycarbonate and PMMA (poly methyl methacrylate). The disk base has pregrooves wobbled along the radius direction of the magneto-optical disk on the basis of address data in a spiral fashion. The recording film is a thin film formed by depositing or sputtering a magneto-optical recording material, such as TbFeCo or the like on the disk base at its surface in which the pregrooves are wobbled previously. The protecting film is formed on the recording layer by using a ultraviolet-curing resin in order to protect the recording layer. The magneto-optical disk 12 includes a data recording area and a table of contents area in which content information is recorded. Data is recorded on the data recording area along the pregrooves in either a discrete or a continuous fashion. Data is recorded on the data recording area of the magneto-optical disk 12 intermittently in units of a cluster and recorded data is read out from the data recording area of the magneto-optical disk 12 intermittently in units of a cluster. One cluster is composed of 32 sectors in which data is recorded in actual practice and 4 linking sectors. Of the 4 linking sectors, the leading 3 sectors are used to prevent interference of CIRC-interleaved data between adjacent clusters. The remaining one sector following the 3 sectors is used as a subdata sector. One sector is composed of a plurality of sound groups and 11 sound groups constitute a pair of sectors. In this embodiment, one sector is formed of 2352 bytes wherein 2332 bytes are data bytes. One sound group is formed of 424 bytes representing 512 samples of right-channel and left-channel audio signals and corresponds to a playback time of 11.61 milliseconds. On the table of contents (TOC) area, there are recorded title information concerning data recorded on the data area or program, address information such as a start address and an end address of each data or program and information indicative of a connection relation (i.e. linking data) between each small recording area and a part P. This table of contents area is read out by the optical pickup before data is recorded on the data recording area or data is reproduced after the magneto-optical disk 12 is loaded onto the recording and/or reproducing apparatus. Data which results from reading the table of contents area is memorized in the memory area provided within a system controller, which will be described later on, and a special memory area provided within a buffer memory which will be described later on. The start address and the end address recorded on the table of contents area are each formed of 24-bit data. The high-order 14-bit data expresses a cluster number, the following 6-bit data expresses a sector number and the low-order 4 bit-data expresses a sound group number. The pregrooves are wobbled in the radius direction of the disk on the basis of a signal modulated on the basis of address data including addresses of pregroove clusters and sectors formed on the magneto-optical disk 12. The system controller, which will be described later on, confirms and manages the recording position or reproducing position by demodulating a signal which results from reading the pregrooves upon recording or reproducing.

Figure 3:
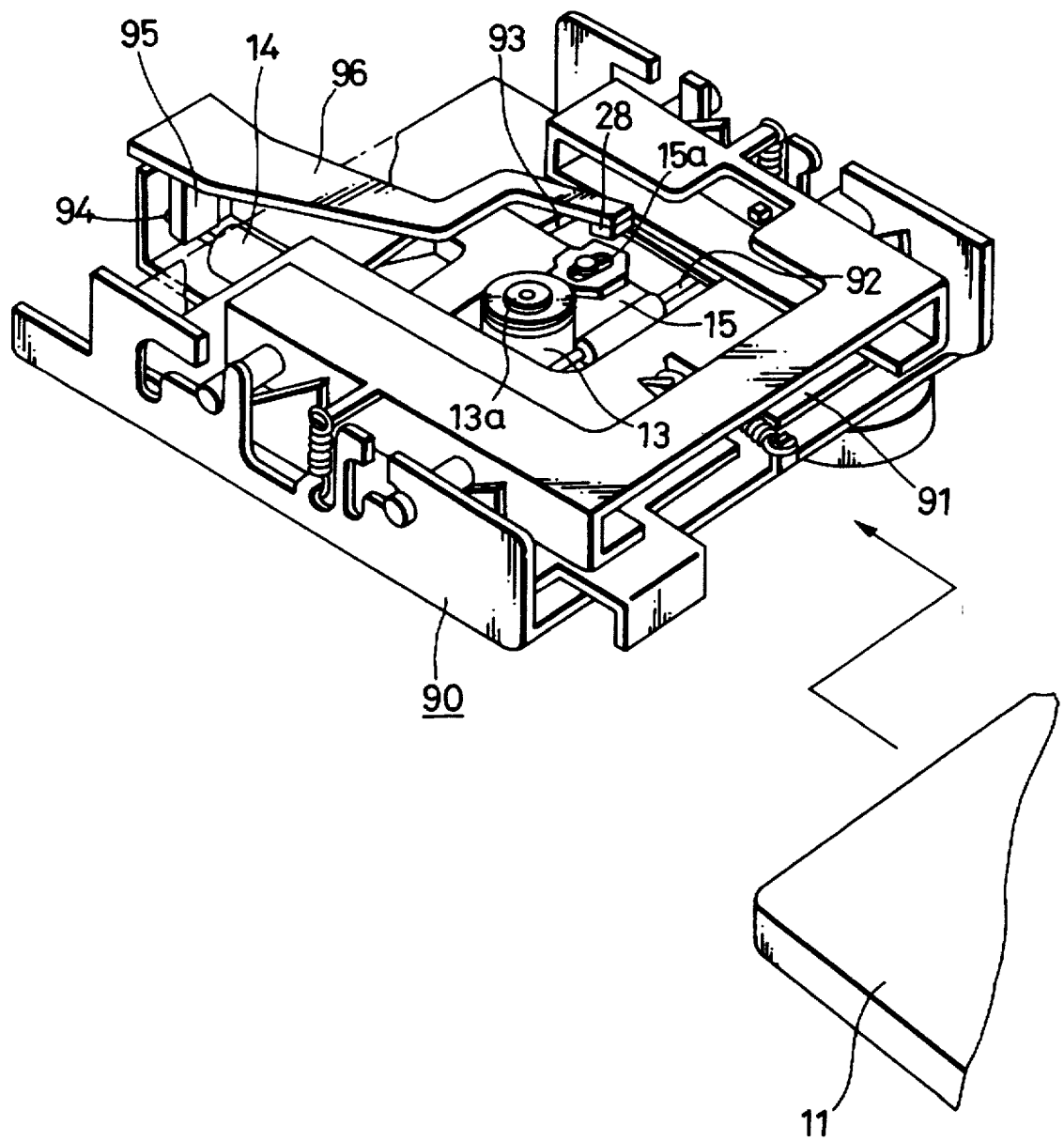
FIG. 3 is a perspective view showing mechanisms disposed in the inside of the recording and/or reproducing apparatus according to the embodiment of the- present invention.

A spindle motor 13 rotates the magneto-optical disk 12 at a constant linear velocity. The spindle motor 13 has a turntable 13a attached to the tip end side of the rotary shaft thereof as shown in FIG. 3. The magneto-optical disk 12 of the disk cartridge loaded onto the recording and reproducing apparatus is placed on the turntable 13a.

An optical pickup 15 includes an objective lens 15a as shown in FIGS. 2 or 3. The optical pickup 15 comprises a laser light source, an optical system such as a beam splitter for dividing light beam emitted from the a light source and reflected-back light from the magneto-optical disk 12 and a photodetector for receiving the reflected-back light divided by the beam splitter or the like, though not shown. The objective lens 15a converges the light beam emitted from the light source on the recording film through one opening portion of the disk cartridge 11 and the disk base. The optical pickup 15 includes an actuator (not shown) for moving the objective lens 15a in the focusing direction and in the tracking direction. This actuator is supplied with a focusing servo signal and a tracking servo signal from a servo controller which will be described later on. As a consequence, the objective lens 15a is moved in the focusing direction and the tracking direction so as to cancel a focusing error signal and a tracking error signal, thereby carrying out the focusing servo and the tracking servo.

A magnetic head 28 is opposed to the protecting film side of the magneto-optical disk 12 through the other opening portion of the disk cartridge 11. The magnetic head 28 is disposed at the position opposing the optical pickup 15 across the magneto-optical disk 12. The magnetic head 28 generates a vertical magnetic field corresponding to recorded data on the basis of a drive signal supplied thereto from a head driver which will be described later on. The vertical magnetic field thus generated is applied to the recording film from the protecting film side of the magneto-optical disk 12. The magnetic head 28 is mechanically linked to the optical pickup 15 so that the magnetic head 28 is moved in the radius direction of the magneto-optical disk 12 when the optical pickup 15 is moved in the radius direction. Supporting structures for supporting the optical pickup 15 and the magnetic head 28 will be described later on. Only upon recording, the magnetic head 28 is moved at the recording position at which it is placed close to or in contact with the magneto-optical disk 12. Upon reproducing and other operation modes than the recording mode, the magnetic head 28 is held at the position distant from the magneto-optical disk 12 over the recording position.

The magnetic head 28 is elevated or moved by a loading motor 14 between a first position at which it becomes close to or contacts with the magneto-optical disk 12 and a second position at which it is spaced apart from the magneto-optical disk 12. The loading motor 14 is driven by a driver 24 on the basis of an output signal supplied thereto from a loading motor controller 22. The rotation of the loading motor 14 is detected by a frequency generator 25 serving as a rotation detector. The frequency generator 25 generates an FG pulse at a period corresponding to a rotational speed of the loading motor 14. This pulse FG is supplied to the loading motor controller 22. The loading motor controller 22 controls the loading motor 14 through the driver 24 such that the FG pulse supplied from the frequency generator 25 becomes a predetermined period.

A switch 23 is connected to the loading motor controller 22. The switch 23 is turned on or off to thereby change the drive speed of the loading motor 14. The switch 23 is turned on and off under the control of a control signal supplied thereto from a system controller which will be described later on. Specifically, the switch 23 is switched to the opened state when 2-channel signals, i.e., a stereo signal is recorded on the magneto-optical disk 12. The switch 23 is switched to the closed state when a one-channel signal, i.e., a monaural signal is recorded on the magneto-optical disk 12. As a result, the loading motor 14 is controlled such that, when the switch 23 is set in the closed state, or the monaural signal is recorded on the magneto-optical disk 12, the rotational speed thereof becomes substantially ⅓ of the rotational speed at which the loading motor 14 is driven when the switch 23 is set in the opened state, i.e., when the stereo signal is recorded on the magneto-optical disk 12. If the magnetic head 28 is moved from the reproducing position to the first position during about one second when the stereo signal is recorded on the magneto-optical disk 12, then the magnetic head 28 is moved from the second position to the first position during about three seconds when the monaural signal is recorded on the magneto-optical disk 12.

The feed motor 21 supplies a drive force to a feed mechanism (not shown) based on a feed signal supplied thereto from a servo controller, which will be described later on, to thereby feed the optical pickup 15 in the radius direction of the magneto-optical disk 12. The feed mechanism is composed of a plurality of gears to which a drive force from the feed motor 21, for example, is transmitted and a feed screw for feeding the optical pickup 15 in the radius direction of the magneto-optical disk 12. The feed motor 21 rotates a plurality of gears and a rotation of the gear provided at the final stage is transmitted to the feed screw to move the optical pickup 15 and the magnetic head 28 in the radius direction.

An analog-to-digital (A/D) converter 36 converts an input signal supplied thereto from an input terminal 35, an analog audio signal from an external device connected to the apparatus body, an analog output signal from a microphone connected to a jack, which will be described later on, or an analog audio signal from a microphone incorporated within the apparatus body which will be described later on, into a digital signal by a sampling frequency of 44.1 kHz and with a quantization bit rate of 16 bits. While a one-channel analog audio signal is shown as input from the input terminal 35 for simplicity, in actual practice, left (L) and (R) 2-channel stereo signals are input from the input terminal 35. This is also true in the following description.

A digital-to-analog (D/A) converter 33 converts an expanded a digital audio signal output thereto from a compressor/expander 32, which will be described later on, to an analog audio signal in a manner opposite to that of the A/D converter 36. The D/A converter 33 supplies the resultant analog audio signal to an output terminal 34.

The compressor/expander 32 is supplied with the digital signal output from the A/D converter 36, e.g., digital audio signal. The compressor/expander 323 compresses the a digital audio signal supplied thereto in the form of about ⅕ data of the original data. In this case, the compressor/expander 32 uses a modified DCT (modified discrete cosine transform) as a compression technique.

The compressed digital data output from the compressor/expander 32 is temporarily stored in a buffer memory 31 through a memory controller 30. The buffer memory 31 might be a DRAM (dynamic random access memory) whose storage capacity is 4 Mbits. Data is written in and read out from the memory 31 under the control of the memory controller 30. When the magneto-optical disk 12 is recorded, digital data output from the compressor/expander 32 is written in the memory 31 at a transfer rate of 0.3 Mbit/second under the control of the memory controller 30. Data stored in the memory 31 is read out therefrom at a transfer rate of 1.4 Mbits/second under the control of the memory controller 30. When the magneto-optical disk 12 is reproduced, digital data output from an encoder/decoder, which will be described later on, is written in the memory 31 at a transfer rate of 1.4 Mbits/second and data stored in the memory 31 is read out from the memory 31 at a transfer rate of 0.3 Mbit/second.

Upon recording, the memory controller 30 sequentially reads out compressed digital data output thereto from the compressor/expander 32 from the memory 31 at a transfer rate about five times as high as the write speed of data in the memory 31 unless there occurs a so-called track jump in which the recording position on the magneto-optical disk 12 jumps to another position or other track due to a disturbance, such as a vibration. Digital data read out from the memory 31 is supplied to an encoder/decoder which will be described later on.

When a detection signal indicative of the occurrence of a track jump during a recording operation of the magneto-optical disk 12 is supplied to the system controller which will be described later on, the memory controller 30 stops the transfer of digital data to the encoder/decoder, which will be described later on, and stores compressed digital data from the compressor/decoder 32 in the memory 31. Thereafter, the memory controller 30 controls the writing and reading of data in and from the memory 31 such that the transfer of digital data from the memory 31 to the encoder/decoder, which will be described later on, is resumed after the irradiation position of the light beam radiated on the magneto-optical disk 12 from the optical pickup 15, i.e., recording position has been corrected. The recording position is corrected on the basis of address data of the magneto-optical disk 12.

When it is detected whether or not a track jump occurred, it can be determined by the system controller, which will be described later on, whether or not a vibration detected by a vibrometer of the recording and/or reproducing apparatus causes the track jump. Further, since the address data is recorded on the pregrooves of the magneto-optical disk 12 as described hereinbefore, if the address data is read out from the pregrooves upon recording and a continuity of decoded address data output from the address decoder, which will be described later on, is monitored, then it is also possible to detect the track jump. Furthermore, it is possible to detect the track jump by calculating a detected signal of the vibrometer and a signal which detects the When the continuity of address data in an OR fashion. When the track jump is detected, the optical pickup 15 lowers the output level of light beam radiated on the magneto-optical disk 12 from the optical pickup 15 to the extent that the recording cannot be made or lowers the output level to zero under the control of the system controller which will be described later on.

In the above-mentioned case, the memory 31 should have a storage capacity large enough to store at least digital data input during the time period until the recording position is corrected to the correct position since the track jump occurred. In this embodiment, as described hereinbefore, the memory 31 is formed of the 4-Mbit DRAM and this storage capacity satisfies the above-mentioned condition.

If the correct recording operation is carried out during the recording operation, then the memory controller 30 controls writing and reading of data in and from the memory 31 such that data stored in the memory 31 can be reduced as much as possible. Specifically, when data amount of the memory 31 increases in excess of a predetermined amount, data of a predetermined amount, e.g., data of one cluster is read out from the memory 31 and a recording capacity of at least a predetermined amount or greater can be constantly maintained within the memory 31.

Digital data read out from the memory 31 is supplied to an EFM (eight-to-fourteen modulation) and CIRC encoder/decoder 17. The encoder/decoder 17 effects an error detecting and correcting code processing on the digital data supplied thereto and also effects a modulation processing suitable for recording on the digital data supplied thereto. In this embodiment, the encoder/decoder 17 effects the EFM (8–14 modulation) on the digital data supplied thereto. In this embodiment, as the error detecting and correcting code, there is used such a one which changes the interleaving effected on the CIRC (cross interleave Reed-Solomon code) of a so-called compact disc (CD).

Recording data output from the encoder/decoder 17 is supplied to the head driver 27. The head driver 27 generates a drive signal for the magnetic head 28 on the basis of recording data and supplies a generated drive signal to the magnetic head 28.

An RF amplifier 16 is supplied with an output signal from a photodetector (not shown) of the optical pickup 15. The RF amplifier 16 generates an RF signal as a read-out signal of the magneto-optical disk 12 on the basis of the output signal from the photodetector of the optical pickup 15. In the case of this embodiment, since the magneto-optical disk 12 is used as the recording medium, the RF amplifier 16 outputs the RF signal on the basis of a difference of the Kerr rotational angle of the light beam reflected on the recording film of the magneto-optical disk 12. This RF signal is supplied to the encoder/decoder 17. Further, the RF amplifier 16 generates a focusing error signal from the output signal of the photodetector on the basis of a so-called astigmatism method. The RF amplifier 16 generates a tracking error signal on the output supplied thereto from the photodetector according to a so-called three-spot method. The RF amplifier 16 detects the wobbled pregrooves on the basis of the output signal supplied thereto from the photodetector according to a push-pull method and supplies a the push-pull signal thus generated to the address decoder. U.S. Pat. No. 4,023,033 discloses an astigmatism method; U.S. Pat. No. 3,876,842 discloses a three-spot method and U.S. Pat. No. 3,909,608 discloses a push-pull method. The disclosure of each of these three U.S. patents is hereby incorporated herein by reference. The focusing error signal and the tracking error signal generated by the RF amplifier 16 are supplied to the servo controller 18 which will be described later on. The RF amplifier 16 supplies the RF signal thus generated to the servo controller 18 which generates a spindle servo signal, as will be described later on.

An address decoder 26 is supplied with the push-pull signal generated by the RF amplifier 16. The address decoder 26 FM-demodulates the push-pull signal supplied thereto to output address data. The address data output from the address decoder 26 is supplied to the encoder/decoder 17, in which it is decoded. The address information thus decoded is used by the system controller 19, which will be described later on, to confirm the recording or reproducing position and to control the position upon recording or reproduction. A synchronizing (sync) signal extracted from the address data decoded by the address decoder 26 is supplied to the servo controller 18, in order to generate a spindle servo signal.

The servo controller 18 is supplied with the focusing error signal, the tracking error signal, the RF signal or the sync signal extracted from the address data from the RF amplifier 16. The servo controller 18 generates a tracking servo signal and a spindle servo signal on the basis of these signals supplied thereto from the RF amplifier 16. The focusing servo signal and the tracking servo signal are supplied to an actuator (not shown) of the optical pickup 15 to thereby carry out the focusing servo and the tracking servo as described hereinbefore.

The servo controller 18 generates the spindle servo signal on the basis of either the RF signal or the sync signal extracted from the address data. The spindle servo signal is supplied through the driver 20 to the spindle motor 13 such that the spindle motor 13 rotates the magneto-optical disk 12 at a constant linear velocity (CLV) under the control of the spindle servo signal supplied thereto. Further, the servo controller 18 generates a feed signal together with the driver 20. How to generate the feed signal by the servo controller 18 and the driver 20 will be described later on. The feed signal thus generated is generated on the basis of a low frequency component of the tracking error signal. The feed signal is supplied through the driver 20 to the feed motor 21 and the feed motor 21 supplies a drive force to a feed mechanism (not shown) on the basis of the feed signal supplied thereto, whereby the optical pickup 15 and the magnetic head 28 are moved in the radius direction of the magneto-optical disk 12 at the same time when the light beam of the optical pickup 15 scans the recording track of the magneto-optical disk 12. The servo controller 18 generates an access signal on the basis of an access command supplied thereto from the system controller 19 and supplies the access signal thus generated to the feed motor 21. In this case, the access signal is supplied to the feed motor 21 to energize the feed mechanism (not shown) to move the optical pickup 15 and the magneto-optical disk 12 in the radius direction of the magneto-optical disk 12 by a distance corresponding to the access command.

The system controller 19 is composed of a microcomputer. The system controller 19 is connected with an input unit 36 and a display unit 37. The system controller 19 generates various control signals for effecting a start or stop of a recording operation or a reproducing operation, an access operation or the like based on an input signal entered by the input unit 36. Also, the system controller 19 controls respective portions of the recording and/or reproducing apparatus, such as the encoder/decoder 17, the memory controller 30, the loading motor controller 22 and the operation of the recording and/or reproducing apparatus. The output level of the light beam emitted from the optical pickup 15 is controlled by the control signal supplied from the system controller 19. The output level of the light beam emitted from the optical pickup 15 upon recording is high enough to record information. Also, when the system controller 19 recognizes that the track jump occurred, the output level of the light beam emitted from the optical pickup 15 is immediately lowered to a level to at which information cannot be recorded, e.g., the output level in the reproduction mode. The system controller 19 is supplied with a stereo/monaural switching control signal from a control signal output terminal 66 which will be described later on. How the system controller 19 controls the feed operation of the feed motor 21 when the stereo/monaural switching control signal is supplied to the system controller 19 will be described later on.

The input unit 36 is mounted on the front panel of the apparatus body and includes a plurality of operation keys, such as a play key for starting the reproducing operation, a recording key for starting the recording operation, a stop key for stopping the recording and reproducing operation and a key for effecting an access or the like.

The display unit 37 is mounted on the front panel of the apparatus body and composed of a display device, such as a liquid crystal display and a fluorescent display tube. The display unit 37 is supplied with a display control signal generated from the system controller 19 based on data recorded on the table of contents area of the magneto-optical disk 12. On the basis of the display control signal, the display unit 37 displays time information, such as a total play time of the magneto-optical disk 12, a reproduction elapse time of data or a program being reproduced, a remaining time of data or a program being reproduced, a remaining recordable time and a track number being reproduced or recorded, etc. If disk title, data or program title information and data concerning recording date of data or program are recorded on the magneto-optical disk 12, then they are selectively displayed on the display unit 37.

An arrangement of the disk loading mechanism of the recording and/or reproducing apparatus will be described in brief with reference to FIG. 3.

As shown in FIG. 3, a disk cartridge 11 is inserted into a chassis 90. The chassis 90 includes a holder 91 so that the holder 91 can be freely elevated to hold the inserted disk cartridge 11. The spindle motor 13, the turntable 13a and the optical pickup 15 are provided under the chassis 90. The chassis 90 includes on its lower surface a pair of parallel guide members 92, 93 which guide the optical pickup 15 in the radius direction of the magneto-optical disk 12. Further, the chassis 90 includes on its lower surface a feed mechanism (not shown) for moving the optical pickup 15 in the radius direction of the magneto-optical disk 12 by the drive force of the feed motor 21. Accordingly, the optical pickup 15 is moved along the pair of guide members 92, 93 in the radius direction of the magneto-optical disk 12 by the feed mechanism which is energized by the drive force from the feed motor 21. The chassis 90 includes on its upper side the magnetic head 28 disposed in an opposing relation to the optical pickup 15. The magnetic head 28 is attached to the tip end of an arm 96. When the arm 96 is rotated, the magnetic head 28 is moved between a position at which the magnetic head 28 becomes close to or contacts with the magneto-optical disk 12 of the disk cartridge 11 through a recess portion formed on the upper surface of the holder 91, i.e., a first position and an upper position at which the magnetic head 28 is spaced away from the holder 91, i.e., a second position. FIG. 3 shows the state that the magnetic head 28 is placed at the second position. The arm 96 is rotated at its base end 95 by a cam mechanism 94 driven by the loading motor 14. The base end 95 of the arm 96 is joined to one end of the optical pickup 15 and therefore the optical pickup 15 and the arm 96 form a cross-section of U-letter configuration. When the disk cartridge 11 has finished being inserted into the holder 91, a link mechanism (not shown) or a drive mechanism disposed within the holder 91 is operated to lower the holder 91. Under the condition that the disk cartridge 11 has finished being inserted into the holder 91, the shutter of the disk cartridge 11 is moved at the position at which it closes a pair of opening portions of the disk cartridge 11. Therefore, when the holder 11 is lowered, the magneto-optical disk 12 accommodated in the disk cartridge 11 is set on the turntable 13a and the optical pickup 15 and the magneto-optical disk 12 are opposed to each other. In this state, as will be described later on, the spindle motor 13 is actuated to rotate the magneto-optical disk 12. Then, TOC data is read out from the magneto-optical disk 12 and stored in the special area of the system controller 19 or the memory 31. At that time, the magnetic head 28 is held at the second position, i.e., the position above the holder 91 as shown in FIG. 3. When the recording and/or reproducing apparatus is switched to the recording operation mode on the basis of the input from the input unit 36, the loading motor 14 is driven to rotate the arm 95 so that the magnetic head 28 is moved to the recording position.

An arrangement for controlling the feed motor 21 (arrangement of a part of the servo controller 18 and the driver 20) will be described with reference to FIG. 4.

Figure 4:
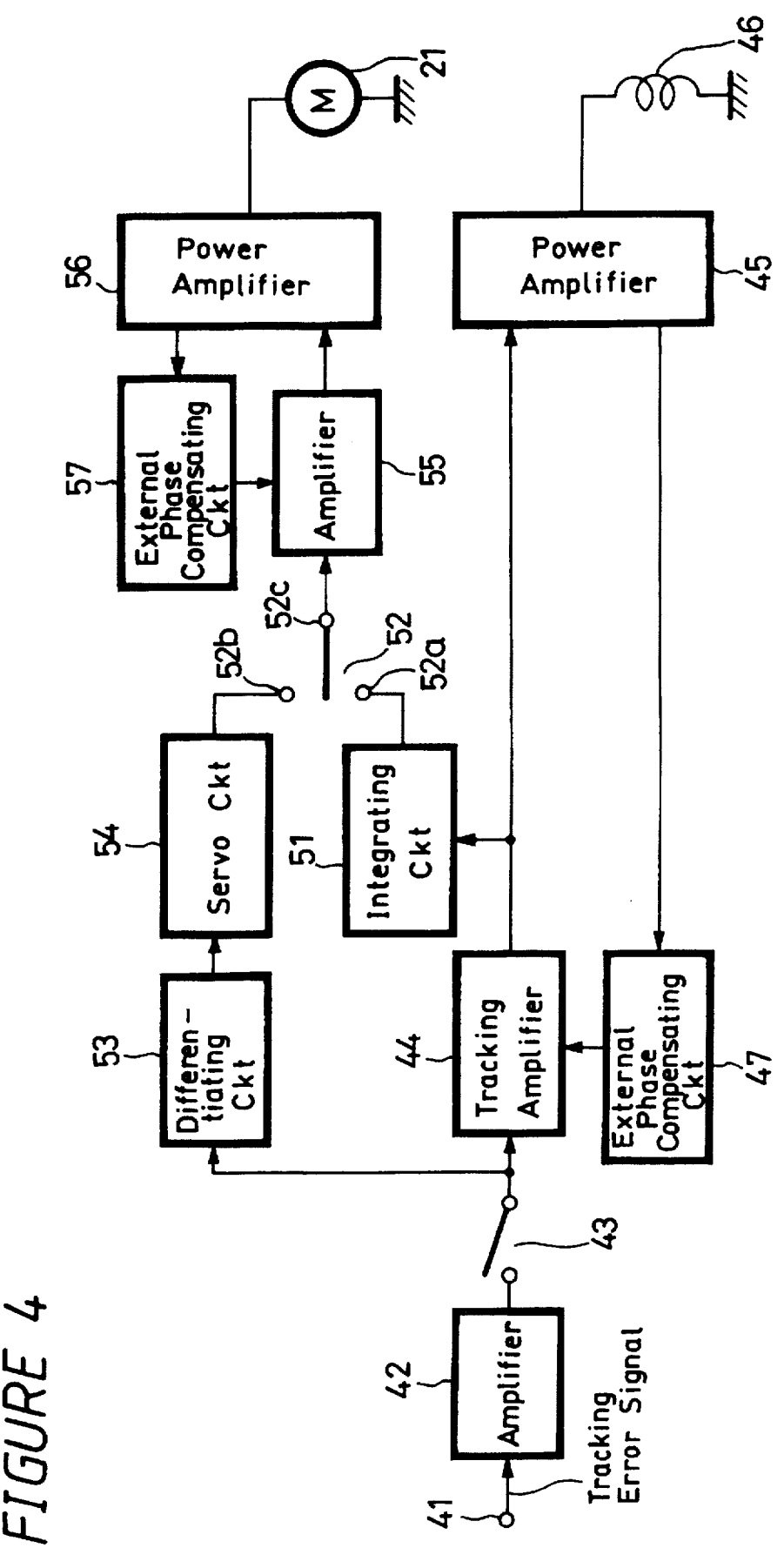
FIG. 4 is a block diagram showing a feed motor driver according to the embodiment of the present invention.

As shown in FIG. 4, the tracking error signal generated by the RF amplifier 16 is supplied to an input terminal 41. The tracking error signal applied to the input terminal 41 is supplied through an amplifier 42 and a switch 43 to a tracking amplifier 44 An output from the tracking amplifier 44 is supplied to and integrated by the integrating circuit 51. An output signal from the integrating circuit 51 is supplied to one fixed contact 52a of a change-over switch 52.

The output signal from the amplifier 42 is also supplied through the switch 43 to a differentiating circuit 53. An output waveform of the differentiating circuit 53 is supplied to a servo circuit 54 which generates a control signal for effecting a servo control based on the output waveform of the differentiating circuit 53. A control signal thus generated from the servo circuit 54 is supplied to the other fixed contact 52b of the change-over switch 52.

A control signal obtained at a movable contact 52c of the change-over switch 52 is supplied through a feed amplifier 55 to a power amplifier 56. The feed motor 21 is driven by the output from the power amplifier 56.

The change-over switch 52 is changed in position under the control of the system controller 19. When data is recorded on the magneto-optical disk 12, the change-over switch 52 connects the movable contact 52c to the fixed contact 52b (servo circuit 54 side) under the control of the control signal supplied thereto from the system controller 19. In other modes than the recording operation, such as the reproduction operation, the change-over switch 52 connects the movable contact 52c to the fixed contact 52a (integrating circuit 51 side) under the control of the control signal supplied thereto from the system controller 19.

An external phase compensating circuit 57 compensates a phase based on the driving state of the power amplifier 56.

As described above, when data is reproduced from the magneto-optical disk 12, if the change-over switch 52 connects the movable contact 52c to the fixed contact 52a (integrating circuit 51 side), then the feed motor 21 is controlled based on the output from the integrating circuit 51. At that time, the feed motor 21 is driven at a relatively high speed. When the optical pickup 15 is moved by the feed motor 21 upon reproduction, it takes about two seconds for the optical pickup 15 to move from the innermost peripheral position to the outermost peripheral position of the magneto-optical disk 12.

When data is recorded on the magneto-optical disk 12, the change-over switch 52 connects the movable contact 52c to the fixed contact 52b (servo circuit 54 side) under the control signal supplied thereto from the system controller 19, whereby the control signal corresponding to the period of the pulse waveform output from the differentiating circuit 53 for controlling the servo circuit 54 is supplied to the feed motor 21. At that time, the feed motor 21 is driven at the speed of about ⅓ of the speed at which the feed motor 21 is driven by the control signal from the servo circuit 54. When the optical pickup 15 is moved by the feed motor 21 upon recording, it takes about 6 seconds for the optical pickup 15 to move from the innermost peripheral track to the outermost peripheral track of the magneto-optical disk 12. This is also true when the optical pickup 15 moves from the outermost peripheral track to the innermost peripheral track of the magneto-optical track 12.

The feed motor 21 is driven at the speed of about ⅓ of the reproducing speed when the 2-channel signal like the stereo signal is recorded on the magneto-optical disk 12. When the 1-channel signal like the monaural signal is recorded on the magneto-optical disk 12, the feed motor 21 is driven at the speed of about ½ of the reproducing speed due to the processing within the servo circuit 54 upon recording. As a result, the feed motor 21 is driven at the speed of about ⅙ of the reproducing speed. When the feed motor 21 is driven at the speed of about ⅙, it takes about 12 seconds for the optical pickup 15 to move from the innermost peripheral track to the outermost peripheral track of the magneto-optical disk 12. The servo circuit 54 is supplied with a control signal based on the recording channel indicative of the recording of 1-channel signal or 2-channel signals from the system controller 19.

The objective lens 15a is controlled in tracking based on the output signal from the tracking amplifier 44. Specifically, the output of the tracking amplifier 44 is supplied to the power amplifier 45. The output signal from the power amplifier 45 is supplied to a tracking coil 46 of the actuator of the optical pickup 15 to thereby move the objective lens 15a in the tracking direction. In this case, the external phase compensating circuit 47 compensates a phase on the basis of the driving state of the power amplifier 45.

An arrangement of an audio signal input unit of the recording and/or reproducing apparatus will be described below with reference to FIGS. 5 and 6. The recording and/or reproducing apparatus according to this embodiment incorporates a microphone 61 and a jack 70 to which an external microphone is connected as shown in FIG. 6. In the recording and/or reproducing apparatus according to this embodiment, an audio signal picked up by the microphone can be recorded in addition to an audio signal from an external device connected to the apparatus. Also, an audio signal picked up by a microphone (not shown) connected to the jack 70 can be recorded. In FIG. 6, reference numeral 100 generally depicts a recording/reproducing apparatus. This recording and/or reproducing apparatus 100 includes an insertion portion 101 into which the disk cartridge 11 is inserted. The disk cartridge 11 inserted into the recording and/or reproducing apparatus 100 from the insertion portion 101 is inserted into the holder 91 shown in FIG. 3. The inserted disk cartridge 11 is set on the turntable 13a when the holder 91 is lowered similarly as mentioned before.

The incorporated microphone 61 is a monaural microphone and the jack 70 is of the structure to which any one of the stereo microphone and the monaural microphone can be connected. FIG. 5 shows a specific arrangement of the microphone input portion. A circuit arrangement around the incorporated microphone 61 will be described below.

Figure 5:
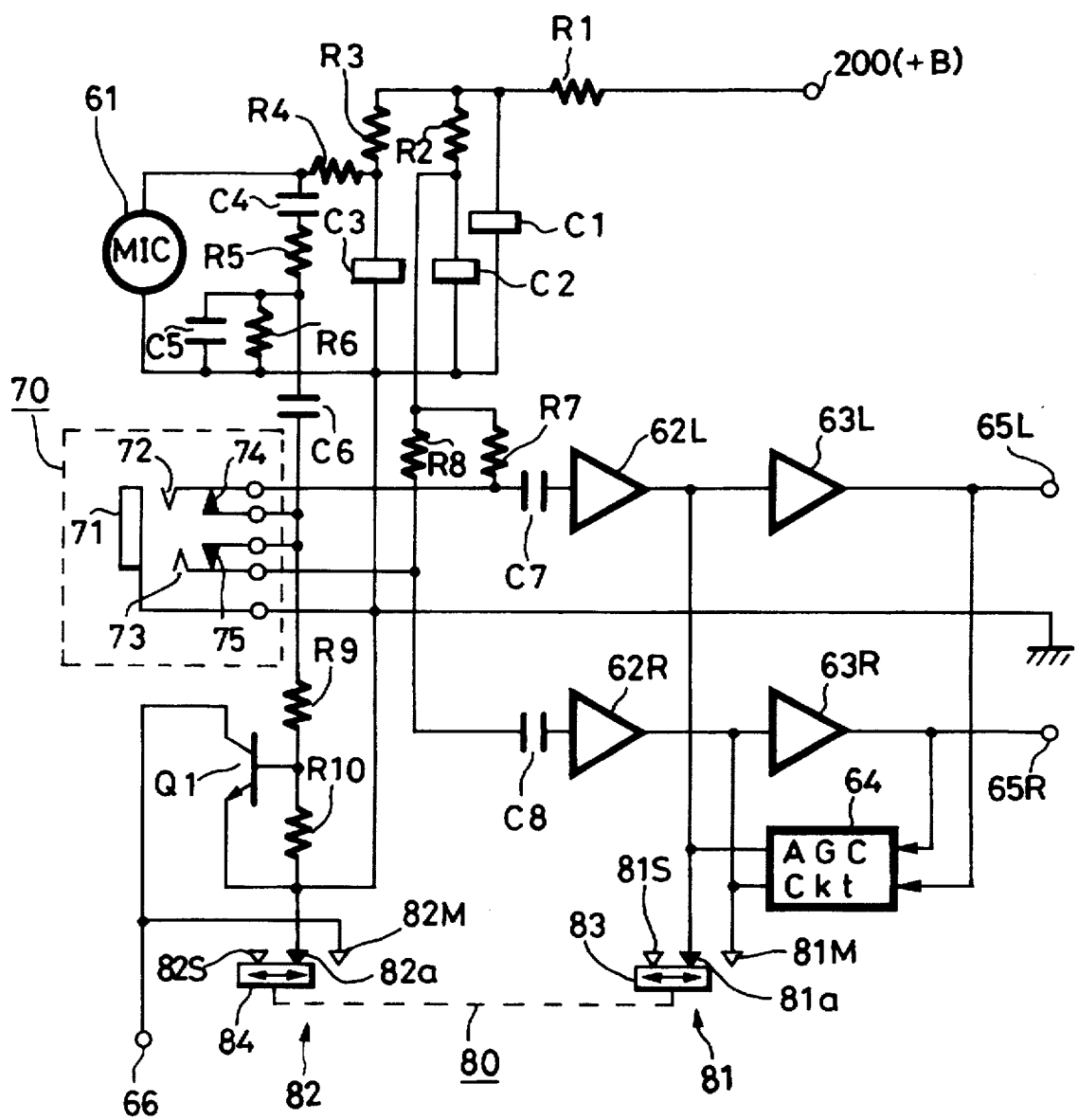
FIG. 5 is a block diagram showing an arrangement of a microphone input portion according to the embodiment of the present invention.
Figure 6:
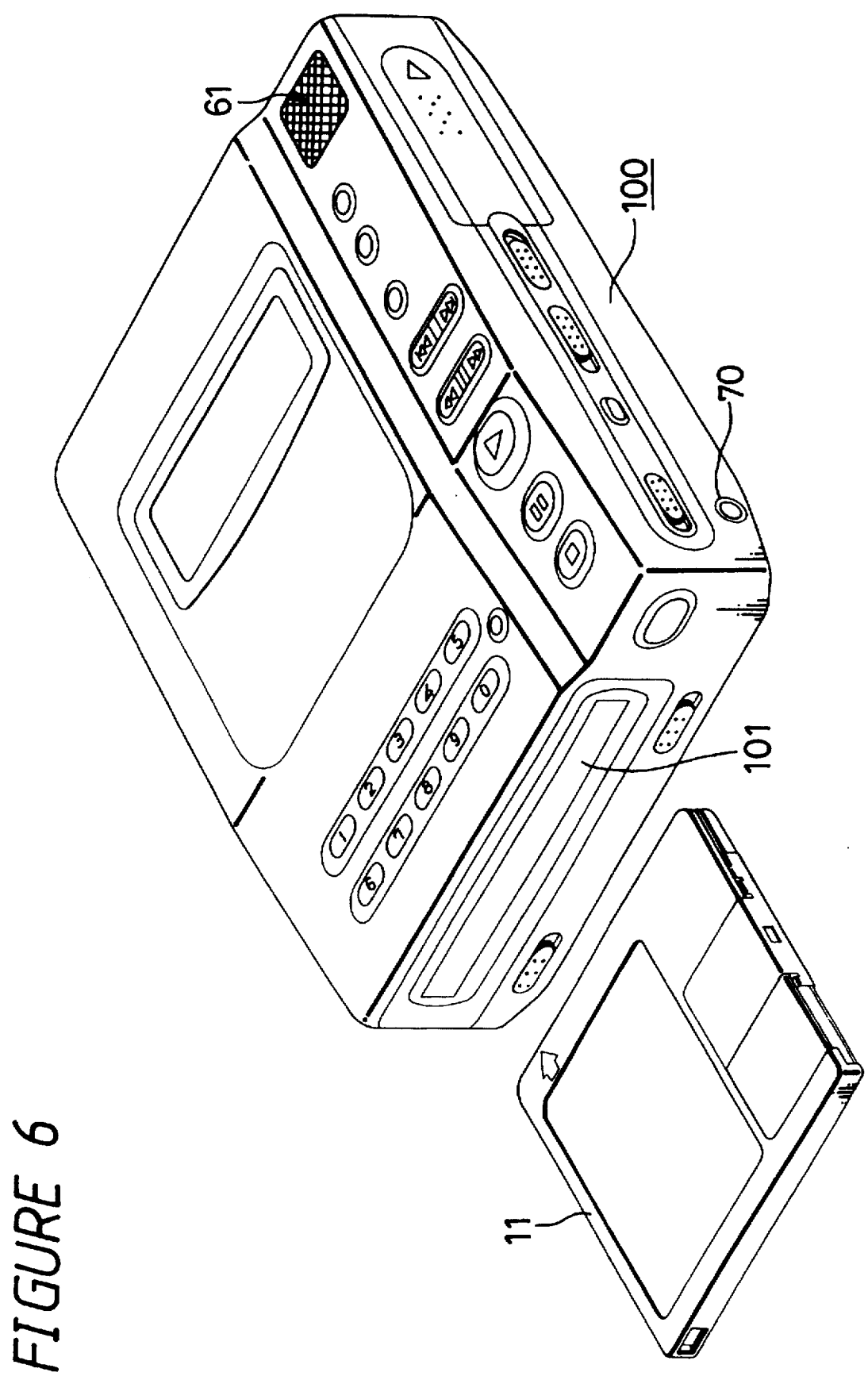
FIG. 6 is a perspective view showing an outer face of the recording and/or reproducing apparatus according to the present invention.

As shown in FIG. 5, a terminal 200 at which a positive DC voltage (+B) is connected is connected to one end of the incorporated microphone 61 through resistors R1, R3 and R4. The other end of the microphone 61 is grounded. Capacitors C1, C2, C3 and a resistor R2 are connected in parallel to the portions facing these circuits, as shown in FIG. 5. A series circuit of a capacitor C4 and resistors R5, R6 is connected in parallel to the microphone 61 and a capacitor C5 is connected in parallel to the resistor R6. An audio signal output from the microphone 61 is obtained from the junction between the resistors R5 and R6. This audio signal is supplied to contacts 74, 75 of the jack 70.

In this case, the capacitor C4 functions as a low-level cutting capacitor of the microphone 61 and the capacitor C5 functions as a high-level cutting capacitor of the microphone 61. A sound pickup level of the microphone 61 is adjusted by the resistance ratio of the resistors R5 and R6.

Signals supplied to the contacts 74, 75 of the jack 70 are supplied through terminal portions 72 and 73 and the capacitors C7, C8 to input amplifiers 62L, 62R, respectively. Output signals from the input amplifiers 62L, 62R are supplied through buffer amplifiers 63L, 63R to input terminals 65L, 65R, respectively. Output signals from the input terminals 65L, 65R are supplied to the input terminal 35 shown in FIG. 2.

A junction between the resistor R2 and the capacitor C2 is connected through resistors R7, R8 to the terminal portions 72, 73 of the jack 70 to supply the positive DC voltage (+B) to the external microphone (not shown) connected to the jack 70. Of a plurality of terminal portions of the jack 70, a terminal portion 71 is grounded.

Under the condition that the external microphone is not connected to the jack 70 (under the state shown in FIG. 4), the contact 74 is brought in contact with the terminal portion 72 and the contact 75 is brought in contact with the terminal portion 73 when the external microphone is connected to the jack 70, i.e., a plug of the external microphone is inserted into the jack 70, the contacts 74, 75 are disconnected from the terminal portions 72, 73, respectively.

When the plug of the external microphone is inserted into the jack 70, the left-channel audio signal is supplied from the plug side of the external microphone to the terminal portion 72 and the right-channel audio signal is supplied from the plug side of the external microphone to the terminal portion 73. Further, under the condition that the external microphone is not connected to the jack 70, as earlier noted, the 1-channel audio signal serving as the output from the incorporated microphone 61 is supplied through the contacts 74, 75 to the terminal portions 72, 73.

The 2-channel audio signals that have been supplied to the terminal portions 72, 73 from the external microphone are supplied through the capacitors C7, C8 to the input amplifiers 62L, 62R and further supplied through the buffer amplifiers 63L, 63R connected to the next stage of the input amplifiers 62L, 62R to input terminals 65L, 65R of left and right 2-channel audio signals. When the incorporated microphone 61 is in use, the 1-channel signal, i.e., the same signal is supplied to the input terminals 65L, 65R. The 2-channel audio signals supplied to the input terminals 65L, 65R are supplied to the input terminal 35 shown in FIG. 2.

A part of the outputs of the buffer amplifiers 63L, 63R is supplied to an AGC (automatic gain control) circuit 64. Also, the output of the AGC circuit 64 is fed back to the input stages of the buffer amplifiers 63L, 63R, thereby the input gains of the buffer amplifiers 63L, 63R being controlled.

The microphone input unit is provided with a stereo/monaural change-over switch 80. When the change-over switch 80 is operated, the input audio signal input to the input terminal 35 as shown in FIG. 2 can be switched to the 2-channel stereo audio signals and the 1-channel monaural audio signal. Specifically, the stereo/monaural change-over switch 80 is a manual change-over switch and includes first and second switching portions 81, 82. Contact members 83, 84 of the stereo/monaural change-over switch 80 are moved in unison with the switching operation and the stereo/monaural change-over switch 80 is changed-over in unison with the two switching portions 81, 82.

When the switch 80 is switched to the monaural side, i.e., the switch 80 is changed-over such that the contacts 83, 84 connect contacts 81a and 81M, the first switching portion 81 mixes the input audio signals output thereto from the amplifiers 62L, 62R. Specifically, the output signal from the input amplifier 62L is supplied to the contact 81a and the output signal from the input amplifier 62R is supplied to the contact 81M. At that time, since the two contacts 81a and 81M are connected by the contact member 83, the left and right 2-channel audio signals are mixed and therefore the monaural audio signal is output from the input terminals 65L, 65R. When the switch 80 is switched to the stereo side, the contact member 83 connects the contact 81a and a contact 81S to thereby prevent the left and right 2-channel audio signals from being mixed.

The second switching portion 82 switches the control signal. Specifically, the contact 82a is held at the ground potential and the contact member 83 is switched-so as to connect the contacts 81a and 81M. Simultaneously, a contact member 84 is switched so as to connect contacts 82a and 82M, whereby the contact 82M is connected to a control signal output terminal 66. A control signal is supplied through the control signal output terminal 66 to the system controller 19. When the switch 80 is switched to the monaural side, the contacts 82a and 82M are connected by the contact member 84, whereby the low-level signal is output from the control signal output terminal 66 as the control signal. When the switch 80 is switched to the stereo side, the contact member 84 connects the contact 82a and a contact 82S to thereby output a high-level signal from the control signal output terminal 66 as the control signal.

It is determined by the system controller 19 on the basis of the control signal indicative of the recording mode supplied from the control signal output terminal 66 whether the recording mode for recording a signal on the magneto-optical disk 12 is a recording mode in which the 2-channel signals, i.e., stereo signal is recorded or a recording mode in which the 1-channel signal, i.e., monaural signal is recorded on the magneto-optical disk 12. The system controller 19 identifies the recording mode as the stereo signal recording mode when the control signal indicative of the recording mode supplied to the control signal output terminal 66 is the high-level signal and also identifies the recording mode as the monaural signal recording mode when the control signal indicative of the recording mode supplied to the control signal output terminal 66 is the low-level signal.

When the plug of the external microphone is not inserted into the jack 70 and the incorporated microphone 61 is used, the low-level signal is constantly output from the control signal output terminal 66 regardless of the state of the switch 80. Specifically, resistors R9, R10 are connected in series to a capacitor C6 to which the audio signal from the incorporated microphone 61 is supplied and the resistor RIO is grounded. A junction between the resistors R9 and R10 is connected to the base of a NPN transistor Q1. The emitter of the transistor Q1 is grounded and the collector of the transistor Q1 is connected to the control signal output terminal 66.

With the above-mentioned connection, under the condition that the audio signal is obtained from the incorporated microphone 61, i.e., the plug of the external microphone is not inserted into the jack 70, the positive DC voltage (+B) from the resistors R7, R8 is supplied through the jack 70 to the base of the NPN transistor Q1 and the NPN transistor Q1 is turned on, thereby the control signal of the low-level signal being obtained at the control signal output terminal 66. When the plug of the external microphone is inserted into the jack 70, as described above, the state of the control signal changes depending on the state of the switch 80.

The system controller 19 determines on the basis of the state of the control signal supplied thereto through the control signal output terminal 66 whether the recording state is the 2channel stereo audio signal recording mode or the 1-channel monaural audio signal recording mode. Thus, the system controller 19 controls the recording and/or reproducing apparatus to the corresponding state.

A recording operation of the recording and/or reproducing apparatus thus arranged will be described below.

When the recording key of the input unit 38 is operated, the system controller 19 generates the control signal to actuate respective portions of the recording and/or reproducing apparatus. After the respective operations, such as the focusing servo and the tracking servo are actuated, the input signal input from the input terminal 35, e.g., analog audio signal is supplied to the A/D converter 36, in which it is converted to a 16-bit digital signal, i.e., a digital audio signal. The digital audio signal is supplied to the compressor/expander 32, in which it is compressed to data of data amount of about ⅕ and temporarily stored on the memory 31 through the memory controller 30. The digital data temporarily stored in the memory 31 is read out from the memory 31 under the control of the memory controller 30 and supplied to the encoder/decoder 17. The digital data supplied to the encoder/decoder 17 is processed in an EFM fashion and in an error detection and correction code processing fashion and thereby converted to recording data. The recording data is supplied through the head driver 27 to the magnetic head 28. The magnetic head 28 applies a vertical magnetic field modulated by the drive signal based on the recording data. Simultaneously, a light beam having an output level necessary for recording is radiated on the magneto-optical disk 12 from the disk base side of the magneto-optical disk 12. As a result, the recording film of the magneto-optical disk 12 is heated in excess of the Curie temperature by the light beam radiated from the optical pickup 15. Simultaneously, the modulated vertical magnetic field is applied to the recording film of the magneto-optical disk 12 from the magnetic head 28. Thereafter, by the relative movement between the light beam and the magneto-optical disk 12, the temperature of the recording film is lowered than the Curie temperature. At that time, the magnetization direction of the recording film is changed and determined in accordance with the direction of the vertical magnetic field applied to the magneto-optical disk 12 by the magnetic head 28 to thereby record data on the magneto-optical disk 12. In this way, data of about 2 seconds (one cluster) of the original analog audio signal is recorded on the magneto-optical disk 12 for about 0.4 second. Data is intermittently recorded on the magneto-optical disk 12 in units of clusters.

During a recording operation, when the stereo signal input from the external microphone connected to the jack 70 is recorded, the change-over switch 80 is switched to the stereo side, whereby the high-level signal is output from the control signal output terminal 66 as the control signal indicative of the recording mode. The system controller 19 identifies on the basis of the high-level signal supplied thereto from the control signal output terminal 66 that the stereo signal recording mode is set. As a consequence, the loading motor 14 moves on the basis of the drive control signal supplied thereto from the loading motor controller 22 based on the control signal from the system controller 19 the magnetic head 28 from the second position to the first position at a speed higher than the speed at which the magnetic head 28 is moved to the position close to or in contact with the magneto-optical disk 12 when the monaural signal is recorded on the magneto-optical disk 12. At the same time, the system controller 19 controls the switch 52 so that the switch 52 connects the movable contact 52c to the fixed contact 52b (servo circuit 54 side). As a result, the feed motor 21 is controlled such that its rotational speed becomes about ⅓ of the rotational speed obtained upon reproduction. Then, the feed mechanism that is driven by the feed motor 21 moves the optical pickup 15 and the magnetic head 28 in the radius direction of the magneto-optical disk 12.

When on the other hand the monaural signal is recorded on the basis of the monaural signal output from the microphone 61 incorporated within the apparatus body or the output signal from the microphone connected to the jack 70 or the recording mode for recording the monaural signal is set by switching the change-over switch 80 to the monaural side, the low-level signal is supplied from the control signal output terminal 66 to the system controller 19 as the control signal indicative of the recording mode. The system controller 19 determines on the basis of the low-level signal supplied thereto from the control signal output terminal 66 that the recording mode for recording the monaural signal is set. As a result, the loading motor 14 moves, on the basis of the drive control signal from the loading motor controller 22 based on the control signal from the system controller 19, the magnetic head 28 from the second position to the first position at the speed lower than the speed at which the magnetic head 28 is moved to the position close to or in contact with the magneto-optical disk 12 when the stereo signal is recorded. Simultaneously, the system controller 19 controls the switch 52 such that the switch 52 connects the movable contact 52c to the fixed contact 52b (servo circuit 54 side). Thus, the feed motor 21 is controlled such that the rotational speed thereof becomes about ½ of the speed obtained when the stereo signal is recorded to thereby move the optical pickup 15 and the magnetic head 28 in the radius direction of the magneto-optical disk 12. As described above, when the monaural signal is recorded by using the microphone 61 incorporated within the apparatus body, even in the state that the change-over switch 80 is switched to the stereo side, the recording mode is automatically switched to the monaural signal recording mode.

As described above, by decelerating the speed at which the optical pickup 15 and the magnetic head 28 are moved in the radius direction of the magneto-optical disk 12 by the feed motor 21 as compared with the moving speed in the reproduction mode, it is possible to suppress a noise generated in the feed motor 21 and the feed mechanism driven by the feed motor 21 upon recording operation. Particularly, when the input signal from the microphone is recorded on the magneto-optical disk 12, it is possible to reduce a noise generated from the feed motor 21 and the feed mechanism upon recording operation. Thus, a signal with less noise can be recorded on the magneto-optical disk 12. Further, if the rotational speeds of the feed motor 21 and the loading motor 14 are lower than the rotational speeds obtained when the stereo signal is recorded when the output signal from the microphone 61 incorporated within the apparatus body is recorded on the magneto-optical disk 12, then it is possible to reduce a noise generated in these motors 21, 14 from the microphone 61 incorporated within the apparatus and a noise generated by the mechanism driven by these motors 21, 14. Thus, a more satisfactory signal can be recorded on the magneto-optical disk 12.

During a recording operation, if the system controller 19 determines that the track jump occurred due to a vibration or the like, then the output level of the light beam emitted from the optical pickup 15 is lowered to the extent that data cannot be recorded immediately. At the same time, the supply of recording data to the magnetic head 28 is stopped or the read-out of digital data from the memory 31 is stopped. The input signal input from the input terminal 35 is stored in the memory 31 until the light beam emitted from the optical pickup 15 accesses again the position obtained before the track jump occurs. When the access of the light beam is completed, the output level of the light beam emitted from the optical pickup 15 is raised to the output level necessary for recording. Also, the supply of recording data to the magnetic head 28 is resumed and the recording operation is started.

The system controller 19 determines on the basis of data entered by the input unit 36 or data read out from the memory area of the system controller 19 or data read out from the table of contents area stored in the special memory area of the memory 31 where to start recording the data recording area of the magneto-optical disk 12. Further, upon recording, data read out from the table of contents area and which is stored in the system controller 19 or in the memory 31 is varied in accordance with the recording operation, if necessary. When the recording operation of data corresponding to all input signals is finished or before the disk cartridge 11 is ejected from the recording and/or reproducing apparatus by operating the stop key (not shown) of the input unit 38, the optical pickup 15 and the magnetic head 28 access the table of contents area to update data recorded on the table of contents area of the magneto-optical disk 12. After the updating operation is finished, the disk cartridge 11 is ejected from the recording and/or reproducing apparatus.

A reproduction operation of the recording and/or reproducing apparatus will be described next. When the disk cartridge 11 is loaded onto the recording and/or reproducing apparatus, following the actuating operation of the spindle motor 13 and the pull-in operation of the focusing servo and the tracking servo, the optical pickup 15 is moved in the inner peripheral direction of the magneto-optical disk 12 to thereby read the table of contents area of the magneto-optical disk 12. At that time, the output level of the light beam radiated from the optical pickup 15 on the magneto-optical disk 12 is too low to record data, in other words, such output level is set to the output level low enough to heat the temperature of the recording film to the Curie temperature. The data recorded on the table of contents area and read out therefrom by the optical pickup 15 is stored in the memory area provided within the system controller 19 or in the special memory area provided within the memory 31. Then, the optical pickup 15 is moved in the data recording area of the magneto-optical disk 12 to read out data recorded on the data recording area. The system controller 19 determines on the basis of the input signal input thereto from the input unit 36 where to and how to read out data recorded on the data recording area. The output signal from the photodetector of the optical pickup 15 is supplied to the RF amplifier 16 which generates the RF signal together with the focusing error signal, the tracking error signal or the like. Any one of the focusing error signal, the tracking error signal, the RF signal or the sync signal extracted from the address data is supplied to the servo controller 18 and the servo controller 18 generates the focusing servo signal, the tracking servo signal, the spindle servo signal and the feed signal.

The focusing servo signal and the tracking servo signal are supplied to the actuator of the optical pickup 15 to effect the focusing servo and the tracking servo. The spindle servo signal is supplied to the spindle motor 13 so that the spindle motor 13 is servo-controlled. The RF signal is supplied to the EFM and CIRC encoder/decoder 17, in which it is EFM-decoded and error-corrected. The address data decoded by the address decoder 26 is supplied through the encoder/decoder 17 to the system controller 19. The system controller 19 controls the optical pickup 15 on the basis of address information supplied thereto such that the optical pickup 15 is moved to a proper reproducing position in the radius direction of the magneto-optical disk 12. The system controller 19 controls a position on the recording track at which the optical pickup 15 scans the magneto-optical disk 12 by using reproduced address information. Data is intermittently read out from the magneto-optical disk 12 at the unit of cluster.

Digital data output from the encoder/decoder 17 is, temporarily stored in the memory 31 through the memory controller 30. Unless there occurs the track jump that the reproduced position is unintentionally moved due to a vibration or the like during playback, then the memory controller 30 writes digital data in the memory 31 at a transfer rate of 1.41 Mbits/second and reads out digital data written in the memory 31 at a transfer rate of 0.3 Mbit/second. The memory controller 30 controls writing of digital data in the memory 31 such that a data amount of data stored in the memory 31 becomes less than a predetermined one. When a data amount of-data stored in the memory 31 exceeds the predetermined one, the recording and/or reproducing apparatus is set in the state that reading of data from the magneto-optical disk 12 is stopped, i.e., the recording and/or reproducing apparatus is placed in the so-called pause mode. If it is determined by the system controller 19 upon reproduction that the track jump occurred, then the memory controller 30 stops writing of digital data output from the encoder/decoder 17 in the memory 31 and controls the memory 31 such that memory 31 only transfers digital data to the compressor/expander 32. Then, after the position of light beam radiated from the optical pickup 15 on the magneto-optical disk 12, i.e., the reproducing position accesses the position obtained before the track jump occurs, the write operation of digital data output from the encoder/decoder 17 in the memory 31 is resumed. Until the correcting operation of the reproducing position is finished, digital data stored in the memory 31 is read out from the memory 31, decoded and then output from the output terminal 34.

The digital data read out from the memory 31 is supplied to the compressor/expander 32, in which the digital data is expanded. A digital audio signal output from the compressor/expander 32 is supplied to the D/A converter 33, in which it is converted to an analog audio signal and output from the output terminal 34 to an external circuit, such as an external amplifier circuit.

During this reproducing operation, the memory controller 30 controls writing of data in the memory 31 such that data of a data amount corresponding to a minimum time necessary for correcting the reproducing position or greater is accumulated in the memory 31 in the normal reproducing operation. When the data amount of data stored in the memory 31 becomes less than the predetermined one, the memory controller 30 causes the system controller 19 to generate the control signal to thereby enable the optical pickup 15 to intermittently read out data from the magneto-optical disk 12. Then, the memory controller 30 writes digital data supplied thereto from the encoder/decoder 17 in the memory 31. If the memory 31 is composed of a DRAM having a storage capacity of 1 Mbit, then it takes about 0.9 second to fully write digital data in the memory 31. This digital data is equivalent to an analog signal of about 3 seconds. Specifically, when digital data is fully stored in the memory 31, if the optical pickup 15 which reads out the magneto-optical disk 12 fails to supply the output signal due to a vibration or the like, then the recording and/or reproducing apparatus can continuously output the analog signal from the output terminal 34 as the reproduced signal for about 3 seconds. According to this embodiment, since the DRAM having the storage capacity of 4 Mbits is used as the memory 31, the recording and/or reproducing apparatus can continuously output the reproduced signal from the output terminal 34 for about 12 seconds. During that period, if the reproducing position on the magneto-optical disk 12 by the optical pickup 15 again accesses the position obtained before the track jump occurs and the read-out of data from the magneto-optical disk 12 is resumed, then it is possible to prevent the supply of the analog signal from the output terminal 34 as the reproduced signal from being interrupted. While the stereo signal was recorded on the magneto-optical disk 12 so far, when the monaural signal is recorded on the magneto-optical disk 12, a monaural signal of about 20 seconds, which duration of time is about twice that of the stereo signal, can be stored in the memory 31.

During the reproducing operation, when data recorded on the magneto-optical disk 12 is reproduced, regardless of the fact that the signal recorded on the magneto-optical disk 12 is the stereo signal or the monaural signal, the system controller 19 controls the switch 52 so as to connect the movable contact 52c to the fixed contact 52a (integrating circuit 51 side). As a result, the feed motor 21 is driven at the speed higher than the rotational speeds at which the optical pickup 15 and the magnetic head 28 are rotated when the stereo signal is recorded, thereby the optical pickup 15 and the magnetic head 28 are moved in the radius direction of the magneto-optical disk 12. At that time, the loading motor 14 is not driven and therefore the magnetic head 28 is placed at the second position.

If the reproducing operation is stopped after the reproduction of all data recorded on the magneto-optical disk 12 is finished or the stop key of the input unit 36 is operated, then the reproducing operation is stopped and the disk cartridge 11 is ejected from the recording and/or reproducing apparatus.

Figure 1:
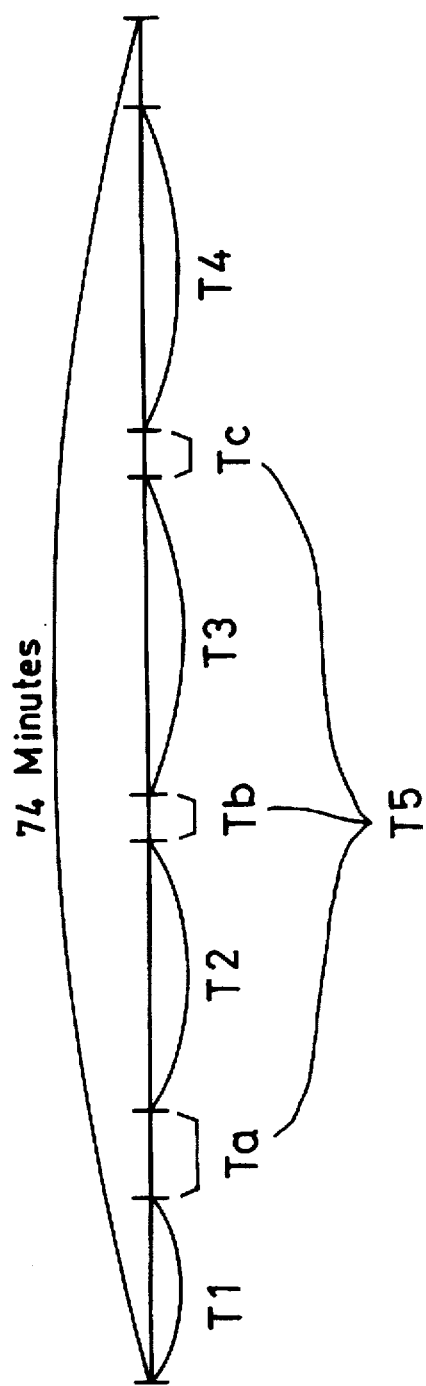
FIG. 1 is a schematic diagram used to explain an example wherein recording areas of a disk are in use.

According to the present invention, since the recording and/or reproducing apparatus is arranged and operated as described above, even if the optical pickup 15 is moved in the radius direction of the magneto-optical disk 12 upon recording, then the moving speed at that time becomes about ½ when the stereo signal is recorded as compared with the moving speed in the reproducing mode. Thus, it is possible to reduce a noise generated when the optical pickup 15 and the magnetic head 28 coupled to the optical pickup 15 are moved in the radius direction of the magneto-optical disk 12. The reason for this is that noises generated from assemblies of the motor and the feed mechanism are substantially in proportion to an energy applied to these assemblies. Specifically, in the recording and/or reproducing apparatus according to this embodiment, as described above with reference to FIG. 1, there is then the possibility that the optical pickup 15 and the magnetic head 28 will be frequently moved in the radius direction of the magneto-optical disk 12 upon recording. However, according to this embodiment, even when the optical pickup 15 and the magnetic head 28 are moved in the radius direction of the magneto-optical disk 12 upon recording, generated noises can be reduced. Accordingly, a noise picked up by the microphone can be reduced and a noise superimposed upon an audio signal recorded on the magneto-optical disk 12 can be reduced. Particularly, when an audio signal is recorded by using the microphone 61 incorporated in the recording and/or reproducing apparatus, the feed mechanism and the microphone 61 incorporated within the recording and/or reproducing apparatus are close to each other with the result that the noise can be reduced more effectively.

In this case, since the feed speed at which the optical pickup 15 and the magnetic head 28 are moved in the radius direction of the magneto-optical disk 12 by the feed motor 21 is set to the data amount of data stored in the memory 31 and the speed corresponding to a time wherein recording of data may be interrupted temporarily, even when the moving speed is lowered, the recording can be prevented from being interrupted and therefore the input audio signal can be recorded continuously. Specifically, according to this embodiment, when the 2-channel stereo signals are recorded, data of about 10 seconds can be stored in the memory 31. In this case, since the optical pickup 15 can be moved from the innermost peripheral track to the outermost peripheral track of the magneto-optical disk 12 within about 6 seconds which are slightly shorter than the 10 seconds worth of data stored in the memory 31, the optical pickup 15 and the magnetic head 28 can be moved by the feed motor 21 at low speed, i.e., with less noise in the radius direction of the magneto-optical disk 12 while the storage capacity of the memory 31 can be utilized effectively.

According to this embodiment, since the feed speed by the feed motor is lowered to about ½ by effectively utilizing the fact that a time of data stored in the memory 31 becomes about twice when the monaural signal is recorded, it is possible to reduce a noise generated by the feed device using the feed motor 21.

Since the optical pickup 15 and the magnetic head 28 are moved at high speed in the radius direction of the magneto-optical disk 12 upon reproduction similarly to the prior art, even if a reproduced track is changed when the optical pickup 15 and the magnetic head 28 are moved by the feed motor 21 upon reproduction, a data amount of data temporarily stored in the memory 31 can be maintained sufficiently. Therefore, even when data cannot be temporarily reproduced from the magneto-optical disk 12 due to a vibration applied to the recording and/or reproducing apparatus from the outside, the audio signal can be continuously reproduced by using the data stored in the memory 31.

According to this embodiment, since the speed at which the magnetic head 28 is moved when the 1-channel monaural signal starts being recorded is sufficiently lowered as compared with the speed at which the magnetic head 28 is moved when the 2-channel stereo signals start being recorded, the noise generated in accordance with the movement of the magnetic head 28 when the monaural signal is recorded can be reduced and the noise picked up by the microphone when the recording is started also can be reduced. In this case, since the amount of the generated noises changes in proportion to the driving speed of the feed motor 21 similarly to the case that the optical pickup 15 and the magnetic head 28 are moved by the feed motor 21 in the radius direction of the magneto-optical disk 12, it is possible to considerably reduce the amount of the generated noises. When the 1-channel monaural signal is recorded, a time of data that can be recorded in the memory 31 becomes about twice. Therefore, even if it takes a lot of time for the magnetic head 28 to move up to the surface of the magneto-optical disk 12, or it takes plenty of time to start the recording on the magneto-optical disk 12 in actual practice since the memory 31 starts memorizing the audio signal from the microphone after the recording start command has been issued, it is possible to record the 1-channel monaural signal satisfactorily.

While a time during which the feed motor 21 can move the optical pickup 15 and the magnetic head 28 in the radius direction of the magneto-optical disk 12 and a time during which the magnetic head 28 can be moved are described so far by way of example, the present invention is not limited thereto and the driving speed can be varied with different ratios. In this case, however, the feed operation by the feed motor 21 and the movement of the magnetic head 28 have to be completed within a time that can be memorized in the memory 31 for recorded data, in actual practice, within a time slightly shorter than the time that can be stored in the memory 31.

Further, while the monaural microphone is used as the incorporated microphone as described above, the present invention is not limited thereto and the recording and/or reproducing apparatus may incorporate a stereo microphone which generates 2-channel audio signals. Of course other sources of audio signals may also be used, including, for example, musical instrument transducers, audio mixing consoles or the like. Further, the above described embodiment could be modified so that a microphone is replaced as an input signal source by, for example, a data feed from a computer/microprocessor or the like.

Furthermore, while the present invention is applied to the recording and/or reproducing apparatus using the magneto-optical disk as described above, the present invention is not limited thereto and can be applied to a recording and/or reproducing apparatus using as a recording medium a recordable optical disk, such as an optical disk using a phase change type optical recording material and a write once optical disk using an organic pigment.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for recording and/or reproducing an optical recording medium which is disk shaped, comprising:
    a recording and/or reproducing pickup for recording an input signal on said optical recording medium loaded on said recording and/or reproducing apparatus and reading out information recorded on said optical recording medium;
    moving means for moving said recording and/or reproducing pickup along the radius direction of said optical recording medium; and
    a controller for controlling said recording and/or reproducing pickup, wherein said controller controls said moving means such that a moving speed for moving said recording and/or reproducing pickup by said moving means when said recording and/or reproducing pickup records input information on said optical recording medium is lowered as compared with a moving speed for moving said recording and/or reproducing pickup by said moving means when said recording and/or reproducing pickup reproduces said optical recording medium, and
    wherein said controller controls said moving means such that said moving speed for moving said recording and/or reproducing pickup by said moving means when said recording and/or reproducing pickup records input information on said optical recording medium is lowered by approximately one-sixth to one-half as compared with a moving speed for moving said recording and/or reproducing pickup by said moving means when said recording and/or reproducing pickup reproduces said optical recording medium.

2. An apparatus for recording and/or reproducing an optical recording medium which is disk shaped, comprising:
    a recording and/or reproducing pickup for recording an input signal on said optical recording medium loaded on said recording and/or reproducing apparatus and reading out information recorded on said optical recording medium;
    moving means for moving said recording and/or reproducing pickup along the radius direction of said optical recording medium; and
    a controller for controlling said recording and/or reproducing pickup, wherein said controller controls said moving means such that a moving speed for moving said recording and/or reproducing pickup by said moving means when said recording and/or reproducing pickup records input information on said optical recording medium is lowered as compared with a moving speed for moving said recording and/or reproducing pickup by said moving means when said recording and/or reproducing pickup reproduces said optical recording medium, and
    wherein said controller controls said moving means such that said moving speed for moving said recording and/or reproducing pickup by said moving means when said recording and/or reproducing pickup records two-channel input signal information on said optical recording medium is lowered by approximately one-third as compared with a moving speed for moving said recording and/or reproducing pickup by said moving means when said recording and/or reproducing pickup reproduces said optical recording medium.

3. An apparatus for recording and/or reproducing an optical recording medium which is disk shaped, comprising:
    a recording and/or reproducing pickup for recording an input signal on said optical recording medium loaded on said recording and/or reproducing apparatus and reading out information recorded on said optical recording medium;
    moving means for moving said recording and/or reproducing pickup along the radius direction of said optical recording medium; and
    a controller for controlling said recording and/or reproducing pickup, wherein said controller controls said moving means such that a moving speed for moving said recording and/or reproducing pickup by said moving means when said recording and/or reproducing pickup records input information on said optical recording medium is lowered as compared with a moving speed for moving said recording and/or reproducing pickup by said moving means when said recording and/or reproducing pickup reproduces said optical recording medium, and wherein said controller controls said moving means such that said moving speed for moving said recording and/or reproducing pickup by said moving means when said recording and/or reproducing pickup records one-channel input signal information on said optical recording medium is lowered by approximately one-sixth as compared with a moving speed for moving said recording and/or reproducing pickup by said moving means when said recording and/or reproducing pickup reproduces said optical recording medium.

* * * * *